(12) United States Patent
Rackham et al.

(10) Patent No.: US 7,429,739 B2
(45) Date of Patent: Sep. 30, 2008

(54) PROVIDING INFORMATION (75) Inventors: James William Rackham, Cumbria (GB); Thomas Dockray, Cumbria (GB)

(73) Assignee: VT Nuclear Services Limited, Southampton, Hampshire (GB)

( * ) Notice: Subject to any disclaimer, the term of this patent is extended or adjusted under 35 U.S.C. 154(b) by 264 days.

(21) Appl. No.: 11/184,269

(22) Filed: Jul. 19, 2005

(65) Prior Publication Data
US 2007/0085017 A1    Apr. 19, 2007

(30) Foreign Application Priority Data
Mar. 24, 2005 (GB) ................... 0506078.5
Mar. 31, 2005 (GB) ................... 0506486.0

(51) Int. Cl.
*G01T 1/00* (2006.01)
(52) U.S. Cl. ...................................... 250/395
(58) Field of Classification Search ............ 250/395
See application file for complete search history.

(56) References Cited

U.S. PATENT DOCUMENTS

| 4,492,863 A | 1/1985 | Smith, Jr. |
| 4,585,939 A | 4/1986 | Arnold et al. |
| 4,617,169 A | 10/1986 | Brodzinski et al. |
| 2003/0205677 A1 * | 11/2003 | Caldwell et al. ............ 250/395 |

OTHER PUBLICATIONS

J. Steven Hansen, *Tomographic Gamma Scanning of Uranium A New Lump Correction Technique*, 7th International Conference of Facility Operations-Safeguards Interface, Feb. 29-Mar. 5, 2004, Charleston, South Carolina, pp. 1-7.

* cited by examiner

*Primary Examiner*—Christine Sung
(74) *Attorney, Agent, or Firm*—Workman Nydegger (57) ABSTRACT

By considering ratio of emissions at one or more pairs of energies to threshold values, the invention provides for the determination of the dispersion format of a radioactive material within a matrix, wherein said radioactive material is potentially present in a dispersion format which is self-shielding against emissions arising from said radioactive. In particular the presence of lumpy material or the confirmation that lump material is absent may be provided. The following pairs of energies: 143.8 keV and 185.7 keV; 163.3 keV and 185.7 keV; 205.3 keV and 187.5 keV may be used.

24 Claims, 5 Drawing Sheets

PROVIDING INFORMATION

CROSS-REFERENCE TO RELATED APPLICATIONS

This application claims priority to United Kingdom Application Ser. No. 0506078.5, filed Mar. 24, 2005 and Ser. No. 0506486.0, filed Mar. 31, 2005, which application are hereby incorporated by reference.

BACKGROUND OF THE INVENTION

1. The Field of the Invention

This invention concerns improvements in and relating to providing information, particularly, but not exclusively, on the dispersion of radioactive material within a matrix.

2. The Relevant Technology

The establishment of the amount of radioactive material within a matrix is useful in a number of situations. Particularly in the context of uranium, the ability of the radioactive material to shield against its own emissions is a potential source of error. At present this is addressed by considering the measured result in a pessimistic manner. However, undue pessimism causes increased cost and exposure to dose considerations.

The present invention has amongst its potential aims to indicate whether self-shielding is an issue for radioactive material within a matrix.

SUMMARY OF THE INVENTION

According to a first aspect of the present invention we provide a method for providing information on the dispersion format of a radioactive material within a matrix, the method comprising:

measuring the emissions from the radioactive material within the matrix at two or more energies;

determining the ratio of the emissions at one of the energies to the emissions at another of the energies; and comparing the ratio value for the ratio of the emissions at the two energies to a value, such as a threshold value, a ratio value to one side of the value, such as the threshold value indicating one dispersion format for the radioactive material in the matrix.

The information on the dispersion format may be an indication that the radioactive material is dispersed or an indication that the radioactive material is not dispersed. The information on the dispersion format may be an indication that the radioactive material can be considered to be dispersed or not be considered to be dispersed. The information may provide a measure of the dispersion format. The measure of the dispersion format may be expressed as a mass and/or a volume and/or, more preferably, as a size. The size may be a diameter and/or radius, particularly a diameter or radius of a spherical particle of radioactive material which would give an equivalent value for the ratio to that observed.

The radioactive material may be uranium and/or an isotope thereof. The uranium may be present along with one or more other elements or isotopes of other elements. The method may provide information on the dispersion of one or more other elements or isotopes of other elements, but need not.

The matrix may be waste. The matrix may be of lower density and/or lower atomic number than the radioactive material. The matrix may be present in a container, for instance a drum or crate.

The emissions from the radioactive material within the matrix, which are measured at two or more energies, may arise from the radioactive material within the matrix due to decay of the radioactive material. Preferably the emissions do not arise as a result of an external radioactive source transmitting emissions into or through the matrix.

Preferably the emissions are gamma emissions.

Preferably the emissions from the radioactive material in the matrix which are measured are distinctive of the radioactive material of interest or an isotope of the radioactive material of interest. Preferably the emissions are distinctive of uranium and in particular of $U^{235}$. The emissions may be distinctive of the radioactive material or an isotope of the radioactive material after correction, for instance, after removing any contribution to the emissions at that energy from other radioactive materials, for instance other than uranium. The emissions may be distinctive of the radioactive material or an isotope of the radioactive material without correction.

One or more of the energies at which emissions are measured may be selected from amongst the following: 143.8 keV; 163.3 keV; 185.7 keV; 205.3 keV; 766.4 keV; 1001.0 keV.

The emissions from the radioactive material within the matrix may be measured at three energies, preferably at four energies. Where three energies are used, preferably they are selected from amongst the following: 143.8 keV; 163.3 keV; 185.7 keV; 205.3 keV. Where three energies are used, preferably they are 185.7 keV and two from amongst 143.8 keV; 163.3 keV; 205.3 keV. Where four energies are used, preferably they are 143.8 keV; 163.3 keV; 185.7 keV; 205.3 keV. The energies measured may be an energy range, for instance 1 keV ranges or 0.6 keV ranges, or even 0.2 keV ranges, about an energy. The range may be applied to any or all of the energies mentioned above. The emissions may be measured as a count and/or count rate and/or peak height and/or peak area, preferably with the same emission measurement type being used for all emission measurements.

The pair of energies for which the ratio of the emissions at one of the energies to the emissions at another of the energies is determined may be any two from amongst: 143.8 keV; 163.3 keV; 185.7 keV; 205.3 keV; 766.4 keV; 1001.0 keV. The pair of energies for which the ratio of the emissions at one of the energies to the emissions at another of the energies is determined may be any two from amongst: 143.8 keV; 163.3 keV; 185.7 keV; 205.3 keV. One or more of the pairs may be a ratio based on the following energies: 143.8 keV and 185.7 keV; 163.3 keV and 185.7 keV; 205.3 keV and 187.5 keV. One or more of the following pairs may be used: 143.8 keV to 185.7 keV; 163.3 keV to 185.7 keV; 205.3 keV to 187.5 keV. The reciprocal ratios, namely 185.7 keV to 143.8 keV; 185.7 keV to 163.3 keV; 185.7 keV to 205.3 keV, may be used for one or more of the ratios.

The ratio of the emissions may have a fixed ratio in one or more dispersion formats, particularly at a dispersion format corresponding to the radioactive material being present as points and/or total dispersion and/or zero diameter. The ratio of the emissions at a dispersion format corresponding to the radioactive material being present as points and/or total dispersion and/or zero diameter may be calculated and/or extrapolated from measured results. The calculation may consider the branching ratios. The ratio of the emissions may have a fixed ratio at a dispersion format corresponding to the radioactive material being present at a thickness at or greater than the thickness at which any increase in thickness does not result in an increase in measurable emissions. Such a fixed ratio may be calculated and/or extrapolated from measured results and/or be determined from measured results.

Two ratios defined by the ratio of the emissions at one of the energies to the emissions at another of the energies may be provided and more preferably three ratios are provided. The two ratios may be provided by considering two different pairs of energies selected from three or more energies which are measured. One of the energies, for instance 185.7 keV, may be included in more than one of the ratios. The three ratios may be provided by considering three different pairs of energy selected from four or more energies which are measured. One of the energies, for instance 185.7 keV, may be included in more than one of the ratios.

The threshold value may be predetermined. The threshold value may be selected from amongst a number and/or range of possible threshold values. The threshold value and/or number of threshold values and/or range of threshold values may be established by calculation, or more preferably by experimentation. The threshold value may be one value from amongst a continuous range of values and/or one value from amongst the values arising with variation in dispersion format and/or size and/or mass and/or diameter of the radioactive material.

The threshold value may be the boundary between a first dispersion format and a second dispersion format. The first dispersion format may be a format not giving self-shielding and/or a dispersed format. The second dispersion format may be a format giving self-shielding and/or a non-dispersed format.

The threshold value may be the lower threshold value or upper threshold value in a threshold range, depending on the nature of the ratio. The threshold value may be the lower threshold value in the threshold range where the ratio is of a lower energy emission to a higher energy emission. The threshold value may be the higher threshold value in the threshold range where the ratio is of a higher energy emission to a lower energy emission. The threshold range may be defined by the threshold value and a further threshold value. The further threshold value may be the boundary between a first dispersion format, particularly the first dispersion format, and a undetermined dispersion format. The undetermined dispersion format may indicate an unreliable and/or unacceptable result.

The further threshold value may be established by calculation and/or more preferably experimentation.

The experimentation, in relation to the threshold value and/or further threshold value, may take the form of measuring the emissions at the two or more energies of interest for a plurality of reference matrices containing radioactive materials. The reference matrices may be the same or different between two or more of the experiments, preferably with known variation. The reference radioactive materials may be different between two or more of the experiments, preferably in a known manner. The reference radioactive materials may vary in terms of their dispersion format. The reference radioactive materials may vary in terms of their diameter and/or thickness. Preferably a range of different diameters and/or thickness are considered from close to zero through to the infinite depth diameter/thickness and ideally beyond. The infinite depth diameter/thickness may be considered as that at which the emissions at an energy remain at a constant level even though the diameter/thickness increases. The ratios of the emissions may be considered, ideally the same ratios as may be considered in the consideration of the radioactive material with the matrix as described above. A plot of the variation in ratio with variation in reference radioactive material dispersion format, for instance diameter, may be provided or derived. The plot may define the threshold value and/or the number of threshold values and/or the range of threshold values and/or the further threshold value and/or the number of further threshold values and/or the range of further threshold values and/or may be used in the defining thereof.

Particularly, but not only, in the context of a threshold value, without a further threshold value, the following features are possibilities. The threshold value may be set at a value 10% removed from the value corresponding to the radioactive material being present as points and/or with total dispersion and/or with zero diameter.

Particularly, but not only, in the context of a threshold value, without a further threshold value, the following features are possibilities. The threshold value may be different for each ratio used. The threshold value may be as follows for the one or more pairs used: in respect of the ratio 143.8 keV to 185.7 keV a threshold value of 0.16±0.01; in respect of the ratio 163.3 keV to 185.7 keV a threshold value of 0.08±0.005; in respect of the ratio 205.3 keV to 187.5 keV a threshold value of 0.095±0.005. More preferably, the threshold value may be as follows for the one or more pairs used: in respect of the ratio 143.8 keV to 185.7 keV a threshold value of 0.16±0.005; in respect of the ratio 163.3 keV to 185.7 keV a threshold value of 0.08±0.0025; in respect of the ratio 205.3 keV to 187.5 keV a threshold value of 0.095±0.0025. Ideally, the threshold value may be as follows for the one or more pairs used: in respect of the ratio 143.8 keV to 185.7 keV a threshold value of 0.16; in respect of the ratio 163.3 keV to 185.7 keV a threshold value of 0.08; in respect of the ratio 205.3 keV to 187.5 keV a threshold value of 0.095.

Particularly, but not only, in the context of a threshold value, without a further threshold value, the following features are possibilities. Where the reverse ratios are used, the threshold values may be the reciprocals of those noted for the different energy pairings. In respect of the ratio 185.7 keV to 143.8 keV a threshold value of 6.25±0.4; in respect of the ratio 185.7 keV to 163.3 keV a threshold value of 12.5±2; in respect of the ratio 187.5 keV to 205.3 keV a threshold value of 10.53±2.4. More preferably, the threshold value may be as follows for the one or more pairs used: in respect of the ratio 185.7 keV to 143.8 keV a threshold value of 6.25±0.2; in respect of the ratio 185.7 keV to 163.3 keV a threshold value of 12.5±1; in respect of the ratio 187.5 keV to 205.3 keV a threshold value of 10.53±1.2. Ideally, the threshold value may be as follows for the one or more pairs used: in respect of the ratio 185.7 keV to 143.8 keV a threshold value of 6.25; in respect of the ratio 185.7 keV to 163.3 keV a threshold value of 12.5; in respect of the ratio 187.5 keV to 205.3 keV a threshold value of 10.53.

Particularly, but not only, in the context of a threshold value, without a further threshold value, the following features are possibilities. In the comparison, where the ratio value is closer to the zero diameter ratio value than the threshold value, the indication may be that the radioactive material is dispersed in the matrix. The ratio value may have an error established for it. The ratio value may be expressed as a ratio value +/− an error, potentially with the error representing the potential variation in the ratio value. In the comparison, where the ratio value and potential variation therein due to error are closer to the zero diameter than the threshold value, the indication may be that the radioactive material is dispersed in the matrix. In the comparison, where the ratio value is on the other side of the threshold compared with the zero diameter ratio value, the indication may be that the radioactive material is not dispersed within the matrix, for instance the radioactive material is as one or more lumps within the matrix or for instance the radioactive material is present in the matrix in a format which provides significant self-shielding. In the comparison, where any part of the ratio value and potential variation therein due to error are on the other side of the threshold compared with the zero diameter ratio value, the indication may be that the radioactive material is not dispersed in the matrix, for instance the radioactive material is as one or more lumps within the matrix or for instance the radioactive material is present in the matrix in a format which provides significant self-shielding.

Particularly, but not only, in the context of a threshold value, without a further threshold value, the following features are possibilities. In particular in the comparison where one or more of the ratios in the format 143.8 keV to 185.7 keV; 163.3 keV to 185.7 keV; 205.3 keV to 187.5 keV are considered the dispersion format may be considered to be of the following form for one or more of the following positions:

where the ratio for 143.8 keV to 185.7 keV is higher than the threshold value, the radioactive material is dispersed in the matrix;

where the ratio for 163.3 keV to 185.7 keV is higher than the threshold value, the radioactive material is dispersed in the matrix;

where the ratio for 205.3 keV to 187.5 keV is lower than the threshold value, the radioactive material is dispersed in the matrix;

where the ratio for 143.8 keV to 185.7 keV is lower than the threshold value, the radioactive material is not dispersed in the matrix and/or the radioactive material is present as a lump and/or the radioactive material is present in a format which provides significant self-shielding;

where the ratio for 163.3 keV to 185.7 keV is lower than the threshold value, the radioactive material is not dispersed in the matrix and/or the radioactive material is present as a lump and/or the radioactive material is present in a format which provides significant self-shielding; and where the ratio for 205.3 keV to 187.5 keV is higher than the threshold value, the radioactive material is not dispersed in the matrix and/or the radioactive material is present as a lump and/or the radioactive material is present in a format which provides significant self-shielding.

Particularly, but not only, in the context of a threshold value, without a further threshold value, the following features are possibilities. In particular in the comparison where one or more of the ratios in the format 185.7 keV to 143.8 keV; 185.7 keV to 163.3 keV; 185.7 keV to 205.3 keV are considered the dispersion format may be considered to be of the following form for one or more of the following positions:

where the ratio for 185.7 keV to 143.8 keV is lower than the threshold value, the radioactive material is dispersed in the matrix;

where the ratio for 185.7 keV to 163.3 keV is lower than the threshold value, the radioactive material is dispersed in the matrix;

where the ratio for 187.5 keV to 205.3 keV is higher than the threshold value, the radioactive material is dispersed in the matrix;

where the ratio for 185.7 keV to 143.8 keV is higher than the threshold value, the radioactive material is not dispersed in the matrix and/or the radioactive material is present as a lump and/or the radioactive material is present in a format which provides significant self-shielding;

where the ratio for 185.7 keV to 163.3 keV is higher than the threshold value, the radioactive material is not dispersed in the matrix and/or the radioactive material is present as a lump and/or the radioactive material is present in a format which provides significant self-shielding; and where the ratio for 187.5 keV to 205.3 keV is lower than the threshold value, the radioactive material is not dispersed in the matrix and/or the radioactive material is present as a lump and/or the radioactive material is present in a format which provides significant self-shielding.

A ratio equal to the threshold may be taken to indicate that the radioactive material is dispersed in the matrix, but is preferably taken to indicate the radioactive material is not dispersed in the matrix and/or the radioactive material is present as a lump and/or the radioactive material is present in a format which provides significant self-shielding.

Particularly, but not only, in the context of a threshold value with a further threshold value, the following features are possibilities. The threshold value may be different for each ratio used. The threshold value may be as follows for the one or more pairs used: in respect of the ratio 143.8 keV to 185.7 keV a threshold value of 0.14±0.02, more preferably ±0.01; in respect of the ratio 163.3 keV to 185.7 keV a threshold value of 0.07+0.01 or −0.005, more preferably ±0.005; in respect of the ratio 205.3 keV to 187.5 keV a threshold value of 0.10−0.01 or +0.005, more preferably ±0.005. More preferably, the threshold value may be as follows for the one or more pairs used: in respect of the ratio 143.8 keV to 185.7 keV a threshold value of 0.14±0.005; in respect of the ratio 163.3 keV to 185.7 keV a threshold value of 0.07±0.0025; in respect of the ratio 205.3 keV to 187.5 keV a threshold value of 0.10±0.0025. Ideally, the threshold value may be as follows for the one or more pairs used: in respect of the ratio 143.8 keV to 185.7 keV a threshold value of 0.14; in respect of the ratio 163.3 keV to 185.7 keV a threshold value of 0.07; in respect of the ratio 205.3 keV to 187.5 keV a threshold value of 0.09. The further threshold value may be different for each ratio used. The further threshold value may be as follows for the one or more pairs used: in respect of the ratio 143.8 keV to 185.7 keV a further threshold value of 0.24±0.05, more preferably ±0.02; in respect of the ratio 163.3 keV to 185.7 keV a further threshold value of 0.11±0.02, more preferably 0.01; in respect of the ratio 205.3 keV to 187.5 keV a further threshold value of 0.07±0.02, more preferably ±0.01. More preferably, the further threshold value may be as follows for the one or more pairs used: in respect of the ratio 143.8 keV to 185.7 keV a further threshold value of 0.24±0.01; in respect of the ratio 163.3 keV to 185.7 keV a further threshold value of 0.11±0.005; in respect of the ratio 205.3 keV to 187.5 keV a further threshold value of 0.07±0.005. Ideally, the further threshold value may be as follows for the one or more pairs used: in respect of the ratio 143.8 keV to 185.7 keV a threshold value of 0.24; in respect of the ratio 163.3 keV to 185.7 keV a threshold value of 0.11; in respect of the ratio 205.3 keV to 187.5 keV a threshold value of 0.07.

Particularly, but not only, in the context of a threshold value with a further threshold value, the following features are possibilities. Where the reverse ratios are used, the threshold values may be the reciprocals of those noted for the different energy pairings. In respect of the ratio 185.7 keV to 143.8 keV a threshold value of 7.2±0.4; in respect of the ratio 185.7 keV to 163.3 keV a threshold value of 14.3±2; in respect of the ratio 187.5 keV to 205.3 keV a threshold value of 10.0±2.4. More preferably, the threshold value may be as follows for the one or more pairs used: in respect of the ratio 185.7 keV to 143.8 keV a threshold value of 7.2±0.2; in respect of the ratio 185.7 keV to 163.3 keV a threshold value of 14.3±1; in respect of the ratio 187.5 keV to 205.3 keV a threshold value of 10.0±1.2. Ideally, the threshold value may be as follows for the one or more pairs used: in respect of the ratio 185.7 keV to 143.8 keV a threshold value of 7.2; in respect of the ratio 185.7 keV to 163.3 keV a threshold value of 14.3; in respect of the ratio 187.5 keV to 205.3 keV a threshold value of 10.0. Where the reverse ratios are used, the further threshold values may be the reciprocals of those noted for the different energy pairings. In respect of the ratio 185.7 keV to 143.8 keV a further threshold value of 4.17±0.4; in respect of the ratio 185.7 keV to 163.3 keV a further threshold value of 9.1±2; in respect of the ratio 187.5 keV to 205.3 keV a further threshold value of 14.3±2.4. More preferably, the further threshold value may be as follows for the one or more pairs used: in respect of the ratio 185.7 keV to 143.8 keV a further threshold value of 4.17±0.2; in respect of the ratio 185.7 keV to 163.3 keV a further threshold value of 9.1±1; in respect of the ratio 187.5 keV to 205.3 keV a further threshold value of 14.3±1.2. Ideally, the further threshold value may be as follows for the one or more pairs used: in respect of the ratio 185.7 keV to 143.8 keV a further threshold value of 4.17; in respect of the ratio 185.7 keV to 163.3 keV a further threshold value of 9.1; in respect of the ratio 187.5 keV to 205.3 keV a further threshold value of 14.3.

Particularly, but not only, in the context of a threshold value with a further threshold value, the following features are possibilities. In the comparison, where the ratio value is closer to the zero diameter ratio value than the threshold value, the indication may be that the radioactive material is dispersed in the matrix. The ratio value may have an error established for it. The ratio value may be expressed as a ratio value +/− an error, potentially with the error representing the potential variation in the ratio value. In the comparison, where the ratio value and potential variation therein due to error are closer to the zero diameter than the threshold value, the indication may be that the radioactive material is dispersed in the matrix. More preferably where the ratio value is between the threshold value and the further threshold value the indication may be that the radioactive material is dispersed in the matrix. More preferably where the ratio value and potential variation therein due to error are between the threshold value and the further threshold value the indication may be that the radioactive material is dispersed in the matrix. In the comparison, where the ratio value is on the other side of the threshold value compared with the zero diameter ratio value, the indication may be that the radioactive material is not dispersed within the matrix, for instance the radioactive material is as one or more lumps within the matrix or for instance the radioactive material is present in the matrix in a format which provides significant self-shielding. In the comparison, where any part of the ratio value and potential variation therein due to error is on the other side of the threshold compared with the zero diameter ratio value, the indication may be that the radioactive material is not dispersed in the matrix, for instance the radioactive material is as one or more lumps within the matrix or for instance the radioactive material is present in the matrix in a format which provides significant self-shielding. In the comparison, where the ratio value is on the other side of the further threshold value compared with the zero diameter ratio value, the indication may be that the measurement is not reliable and/or that further investigation is required. In the comparison, where any part of the ratio value and potential variation therein due to error are on the other side of the further threshold compared with the zero diameter ratio value, the indication may be that the measurement is not reliable and/or that further investigation is required.

Particularly, but not only, in the context of a threshold value with a further threshold value, the following features are possibilities. In particular in the comparison where one or more of the ratios in the format 143.8 keV to 185.7 keV; 163.3 keV to 185.7 keV; 205.3 keV to 187.5 keV are considered the dispersion format may be considered to be of the following form for one or more of the following positions:

where the ratio for 143.8 keV to 185.7 keV is higher than the threshold value, and preferably lower than the further threshold value, the radioactive material is dispersed in the matrix;

where the ratio for 163.3 keV to 185.7 keV is higher than the threshold value, and preferably lower than the further threshold value, the radioactive material is dispersed in the matrix;

where the ratio for 205.3 keV to 187.5 keV is lower than the threshold value, and preferably higher than the further threshold value, the radioactive material is dispersed in the matrix;

where the ratio for 143.8 keV to 185.7 keV is lower than the threshold value, the radioactive material is not dispersed in the matrix and/or the radioactive material is present as a lump and/or the radioactive material is present in a format which provides significant self-shielding;

where the ratio for 163.3 keV to 185.7 keV is lower than the threshold value, the radioactive material is not dispersed in the matrix and/or the radioactive material is present as a lump and/or the radioactive material is present in a format which provides significant self-shielding; and where the ratio for 205.3 keV to 187.5 keV is higher than the threshold value, the radioactive material is not dispersed in the matrix and/or the radioactive material is present as a lump and/or the radioactive material is present in a format which provides significant self-shielding.

Particularly, but not only, in the context of a threshold value with a further threshold value, the following features are possibilities. In particular in the comparison where one or more of the ratios in the format 185.7 keV to 143.8 keV; 185.7 keV to 163.3 keV; 185.7 keV to 205.3 keV are considered the dispersion format may be considered to be of the following form for one or more of the following positions:

where the ratio for 185.7 keV to 143.8 keV is lower than the threshold value, and preferably higher than the further threshold value, the radioactive material is dispersed in the matrix;

where the ratio for 185.7 keV to 163.3 keV is lower than the threshold value, and preferably higher than the further threshold value, the radioactive material is dispersed in the matrix;

where the ratio for 187.5 keV to 205.3 keV is higher than the threshold value, and preferably lower than the further threshold value, the radioactive material is dispersed in the matrix;

where the ratio for 185.7 keV to 143.8 keV is higher than the threshold value, the radioactive material is not dispersed in the matrix and/or the radioactive material is present as a lump and/or the radioactive material is present in a format which provides significant self-shielding;

where the ratio for 185.7 keV to 163.3 keV is higher than the threshold value, the radioactive material is not dispersed in the matrix and/or the radioactive material is present as a lump and/or the radioactive material is present in a format which provides significant self-shielding; and where the ratio for 187.5 keV to 205.3 keV is lower than the threshold value, the radioactive material is not dispersed in the matrix and/or the radioactive material is present as a lump and/or the radioactive material is present in a format which provides significant self-shielding.

A ratio equal to the threshold may be taken to indicate that the radioactive material is dispersed in the matrix, but is preferably taken to indicate the radioactive material is not dispersed in the matrix and/or the radioactive material is present as a lump and/or the radioactive material is present in a format which provides significant self-shielding.

The method may include quantifying the level of self-shielding and/or quantifying the size and/or volume and/or diameter of the radioactive material and in particular an average therefore.

The measured emissions may be corrected to remove emissions from one or more other radioactive materials or isotopes within the matrix. The correction may remove emissions from one or more of plutonium, americium or radon. In particular, the correction may remove emissions from one or more of $Pu^{239}$, $Am^{241}$ or $Ra^{226}$. The 143.8 keV and/or 163.3 keV and/or 185.7 keV and/or 205.3 keV and/or 766.4 keV and/or 1001.0 keV energy and/or range thereabout may be corrected to remove emissions from other than uranium and in particular $U^{235}$. The correction may remove emissions at one or more of the following energies: 143.3 keV, 161.5 keV, 203.6 keV, 146.6 keV, 164.5 keV, 203.8 keV, 186 keV ranges thereabout, for instance ±0.2 or ±0.1 keV. In particular, the correction may remove $Pu^{239}$ emitted gammas at 143.3 keV and/or 161.5 keV and/or 203.6 keV and/or $Am^{241}$ emitted gammas at 146.6 keV and/or 164.5 keV and/or 203.8 keV and/or $Ra^{226}$ emitted gammas at 186 keV.

The measured emissions may be corrected by subtracting the contribution from the one or more other radioactive materials or isotopes. The contribution of the one or more other radioactive materials or isotopes at an energy or within an energy range may be established by considering the emissions at an energy solely indicative of that other radioactive material or isotope. The emissions at that energy solely indicative of the other radioactive material may give the contribution to be subtracted based upon known ratios between emissions at one energy and at other energies for a radioactive material or isotope. The contributions may be attenuation corrected, potentially to reflect the different energies involved. Contributions from two or more different other radioactive materials or isotopes may be subtracted in this way.

Where emissions from one or more other radioactive materials or isotopes within the matrix are detected, the method may only consider those energies of the emissions from the radioactive material in the matrix which are not effected by emissions from the one or more other radioactive materials. Where emissions from one or more other radioactive materials or isotopes within the matrix are detected, the method may only consider ratios which use energies of emission from the radioactive material in the matrix which energies are not effected by emissions from the one or more other radioactive materials. This may result in less than all of the possible ratios being used in the comparison against the threshold value. The measured emissions may only be corrected to remove emissions from one or more other radioactive materials or isotopes within the matrix where a number of ratios are effected by such emissions from one or more other radioactive materials. The number of ratios so effected may be all or all bar one.

The measured emissions may be corrected for matrix attenuation, for instance by considering the effect of the matrix on a transmission source. The effect on a plurality of energies from the transmission source may be considered. The transmission source may be $Eu^{152}$. The different energies of emissions from the radioactive material which are measured may be individually corrected according to the different effects on transmission with different energy. The extent of matrix attenuation may be considered, for instance by comparing the matrix corrected and matrix uncorrected results for the energies and/or ratios.

The first aspect of the invention may include any of the features, options or possibilities set out elsewhere in this application, including the second aspect of the invention.

According to a second aspect of the invention we provide a method of determining one or more threshold values for use in indicating the unknown dispersion format of a radioactive material in a matrix, the method comprising:

measuring the emissions from a known dispersion format of the same radioactive material at two or more energies;

determining the ratio of the emissions at one or the energies to the emissions at another of the energies;

repeating the measuring and determining steps for one or more different known dispersion formats to the known dispersion format, for the same radioactive material; and considering the variation in dispersion format with variation in ratio;

selecting a threshold value to separate one dispersion format from another dispersion format.

The second aspect of the invention may include any of the features, options or possibilities set out elsewhere in this application, including the first aspect of the invention.

The threshold value and/or number of threshold values and/or range of threshold values and/or further threshold value and/or number of further threshold values and/or range of further threshold values may be established by the method. Preferably the threshold value and/or number of threshold values and/or range of threshold values and/or further threshold value and/or number of further threshold values and/or range of further threshold values are stored for future use, particularly in a method according to the first aspect of the invention.

The reference matrices may be the same or different between the two or more repeats of the measuring and determining steps, preferably the variation is known.

The different dispersion formats may be provided by using a range of different diameters of radioactive material. The diameters may range from close to zero through to the infinite depth diameter and ideally beyond. The diameters may range from 0.01 mm through to 50 mm. The infinite depth diameter may be considered as that at which the emissions at an energy remain at a constant level even though the diameter increases. Preferably the ratios of the emissions considered are the same ratios as are considered in the subsequent use of the threshold value, for instance according to the method of the first aspect of the invention. A plot of the variation in ratio with variation in known radioactive material dispersion format, for instance diameter, may be provided or derived. The plot may define the threshold value, the number of threshold values or the range of threshold values.

According to a third aspect of the present invention we provide a method for providing information on the self-shielding of a radioactive material within a matrix, the method comprising:

measuring the emissions from the radioactive material within the matrix at two or more energies;

determining the ratio of the emissions at one of the energies to the emissions at another of the energies; and comparing the ratio value for the ratio of the emissions at the two energies to a threshold value, a ratio value to one side of the threshold value indicating no self-shielding for the radioactive material in the matrix.

The third aspect of the invention may include any of the features, options or possibilities set out elsewhere in this document, including those relating to the first and/or second aspects of the invention.

An indication of no self-shielding for the radioactive material may be provided where the self-shielding is below a given level. The given level may be a fraction of the attenuation due to the matrix. The fraction may be 1 or less, preferably 0.5 or less and more preferably 0.25 or less.

A ratio value to the other side of the threshold value may be taken to indicate self-shielding for the radioactive material.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

In a variety of situations, there is a need to examine matrices to investigate the radioactive material therein. For instance, before sending a waste container to a storage facility there is a need to determine the amount of radioactive material therein for the purposes of criticality control, amongst other reasons.

Techniques exist which seek to establish the amount of radioactive material based upon observing the intensities of emissions at one or more energies. Some such techniques include correction for the reduction in the observed emissions compared with the emitted emissions due to the attenuation effects of the matrix material. The correction may be based upon the effect the matrix has on transmitted emissions (arising from a source outside the matrix) and/or the effect the matrix has on emissions arising from within it (due to the radioactive material itself). Either way a number of distinctive energies are considered and the observed ratio between the signal at one of pair of energies and the signal at the second of a pair of energies is compared with the expected ratio for that pair. The matrix attenuation effects the lower energies to a greater extent than the higher energies and so the variation in the observed ratio relative to the expected ratio gives a measure of the level of matrix attenuation.

To achieve the best measure of attenuation and hence the best correction, energies spread over as wide an energy range as possible are used (for instance 1173 keV ratioed with 1332 keV). Such techniques have been used only to consider matrix attenuation and only where the radioactive material is dispersed as such approaches do not account for the effect of the radioactive material itself on the emissions arising from the radioactive material, self-shielding. No suggestion or measurement on the issue of self-shielding or dispersion format has been provided by the above mentioned matrix attenuation investigating techniques. The two effects are completely different from one another.

The intensities of emissions are greatly reduced when the radioactive material is concentrated. Concentrations occur where there are large single particles of radioactive material and/or small particles of radioactive material in close proximity with one another. The reduction in intensity arises as a result of self-shielding against the emissions by the material itself. Because of this problem, present practices where the material cannot be assumed to be dispersed is to take the determination of the amount of radioactive material present and then apply a correction which allows for a high level of uncertainty as to the self-shielding which may have occurred. In some cases a factor of 8 is applied in this correction.

When a waste container is indicated as having an amount of radioactive material above a threshold, different action normally needs to be taken, for instance repackaging of the container. Whatever action is taken a substantial cost is normally involved. With the level of provision for uncertainty provided there are potentially a large number of containers sent for special treatment when in reality they do not need it. Even waste containers which do not need special treatment may be determined to have more radioactive material in them than they actually do, thereby using up the maximum inventory of radioactive material allowed in a store unnecessarily.

The present invention seeks to improve the consideration of materials, such as waste containers, and in particular to remove the need for the application of the correction for uncertainty to a container where it is established for that container that the radioactive material is sufficiently dispersed for self-shielding not to be an issue.

To establish the position on the level of dispersion the technique does not rely upon transmission based measurements. This is beneficial as quite small particles give self-shielding, but may not readily be detectable by transmission based techniques because they do not encounter the transmitted emissions.

The technique is explained in more detail in the context of uranium as the radioactive material, with that radioactive material being contained in a matrix. Uranium, whose energies and intensities of emissions are set out in Table 1 below, is not an easy material to consider. As can be seen from Table 1 the emission energies which are detectable in a practical sense are not widely spaced and so would not be seen as suitable energies for use in matrix attenuation measurements. However, the applicant has established that the energies can be used to consider the effects of self-shielding, or dispersion format, when considered in an appropriate manner.

TABLE 1

| Isotope | Gamma Ray Energy (keV) | Intensity (gammas/s-g of isotope) |
|---|---|---|
| $U^{235}$ | 143.8 | 0.10962 |
| $U^{235}$ | 163.3 | 0.05081 |
| $U^{235}$ | 185.7 | 0.57240 |
| $U^{235}$ | 205.3 | 0.05011 |
| $U^{238}$ in equilibrium with $Pa^{234}$ m | 766.4 | 0.00207 |
| $U^{238}$ in equilibrium with $Pa^{234}$ m | 1001.0 | 0.00589 |

Theoretically the emissions at these energies have a fixed ratio to one another. However, the self-shielding and the matrix attenuation effects the different energies to different extents and so a shift in the ratios is informative. The applicant has established, however, that as the dispersion of the radioactive material drops (lumpiness increases), almost as soon as there is a self-shielding effect, that self-shielding effect is far larger than the matrix attenuation effect. This is particularly so for many waste matrices where matrix attenuation is in any event low, such as those where the matrix is of low density and/or low atomic number materials. As such the variation in ratio between a pair of energies has been found to inform almost exclusively on the self-shielding or dispersion format of the radioactive material, particularly if the ratio value at which non-dispersion is determined to be an issue is suitably defined. In other cases, the measure of self-shielding and matrix attenuation can be used together with a measure of matrix attenuation alone (using a transmission source, for instance) to identify the self-shielding extent.

To establish the workable technique and to establish the appropriate ratio values at which non-dispersion is determined to be an issue, a series of different known size lumps of uranium were considered and the spectrum arising from them established. From this information the ratios with respect to three pairs of energies were calculated. The energy pairs were 143.8 keV and 185.7 keV, 163.3 keV and 185.7 keV, 205.3 keV and 185.7 keV. As the lump diameters increase the ratios vary as a result of the different effects of the self shielding on the intensities observed. Eventually a constant value for the ratio is reached. The results are used together with values for a zero diameter lump which were based on the ratios of the intensities at the relevant energies set out in Table 1. The results are plotted in FIG. 1.

Figure 1:
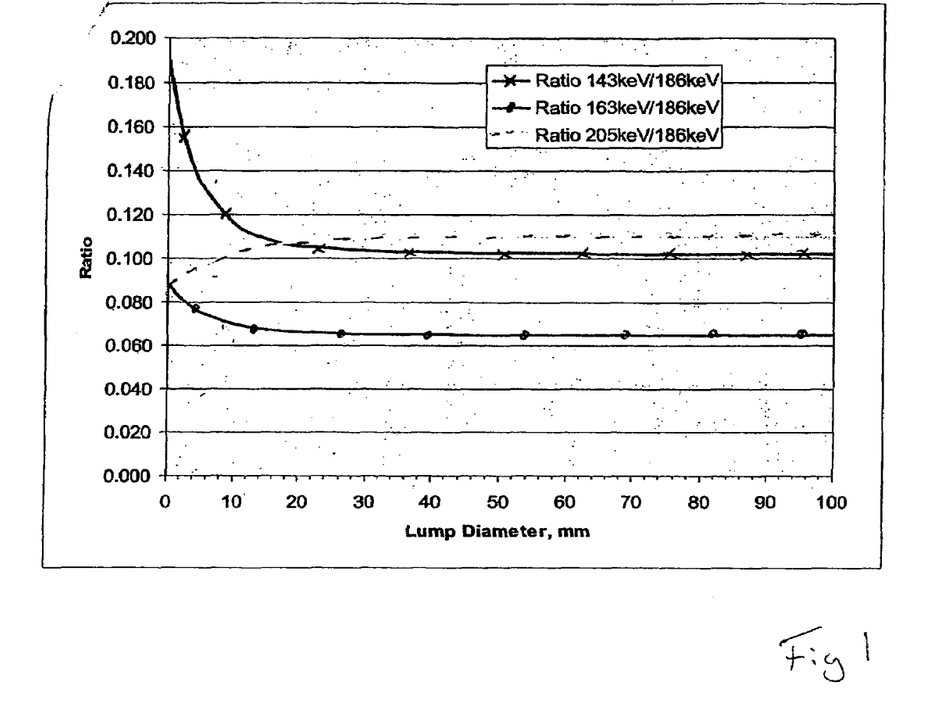
FIG. 1 illustrates the manner in which the ratio of certain energy intensities vary with lump diameter.

The constant ratio values are 0.100 for the 143.8 keV and 185.7 keV ratio, 0.066 for the 163.3 keV and 185.7 keV ratio, 0.106 for the 205.3 keV and 185.7 keV ratio. The constant ratios reflect the "infinite depth" being reached for the lump. This is the thickness beyond which the increase in depth of the lump has no further effect on the intensity observed. The increase in emissions from the additional radioactive material is balanced by the increase in self-shielding from the additional radioactive material.

In relation to an unknown sample, a value for one or more of the ratios can be obtained using a detector sensitive to the appropriate energy range. The value for that ratio can then be compared with the information derived for the ratios above. In particular the value of the ratio can be compared with a threshold value for the ratio. If the value is to one side of the ratio, then one result may be taken, if it is to the other side then an alternative result may be taken. In particular, for the 143.8 keV and 185.7 keV ratio and the 163.3 keV and 185.7 keV ratio, a value lower than the threshold or a value equal to the threshold may be taken to indicate the sample contains a lump of uranium and a value higher than the threshold may be taken to indicate the sample does not contain a lump of uranium. In particular, for the 205.3 keV and 185.7 keV ratio, a value higher than or a value equal to the threshold may be taken to indicate the sample contains a lump of uranium and a value lower than the threshold may be taken to indicate the sample does not contain a lump of uranium. The indication may be the presence or absence of material presenting significant self-shielding.

The threshold may be set, approximately, at a 10% deviation relative to the zero diameter lump value. In respect of the 143.8 keV and 185.7 keV ratio, the threshold may be <0.16 indicating significant self-shielding. In respect of the 163.3 keV and 185.7 keV ratio, the threshold may be <0.08 indicating significant self-shielding. In respect of the 205.3 keV and 185.7 keV ratio, the threshold may be >0.095 indicating significant self-shielding.

Figure 2:
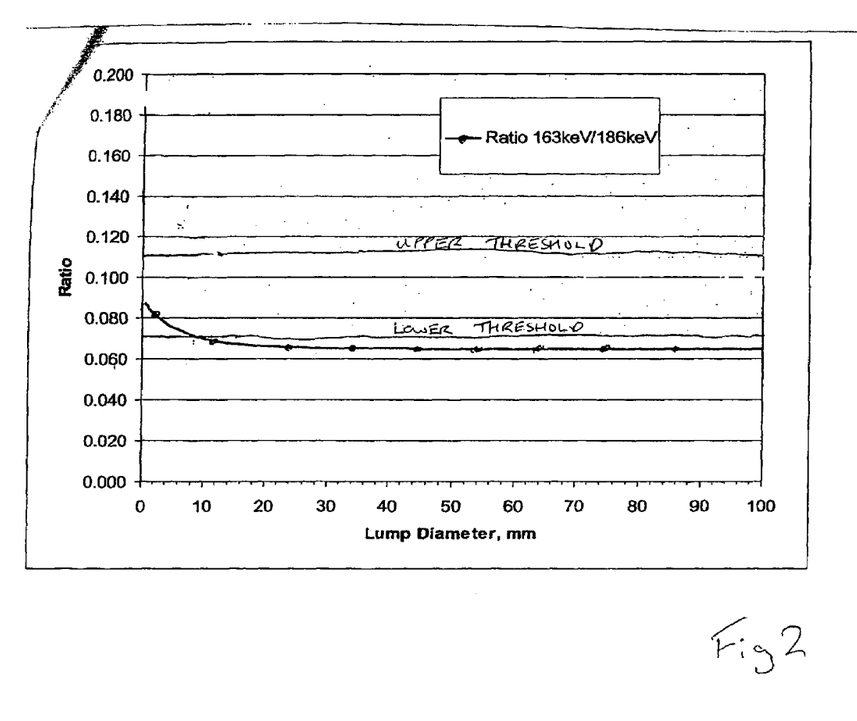
FIG. 2 illustrates the manner in which the ratio of one energy to another varies with lump diameter and the potential thresholds that can be applied thereto.

Instead of a simple threshold, the approach illustrated in FIG. 2 can be taken. With respect to the ratio between emission energies 163 keV to 186 keV, the constant ratio is 0.066 as noted above and the zero diameter ratio indicative of dispersed uranium is 0.088. Between the two values a lower threshold of 0.07 is defined. Above the dispersed uranium ratio an upper threshold value of 0.11 is defined. The 0.07 to 0.11 threshold values thus define a range in respect of which a measured result for an unknown is determined to indicate dispersed uranium if it falls within the range. A measured result falling outside the range with a value below the 0.07 threshold is determined to be non-dispersed, i.e., lumpy. A measured result falling outside the range with a value above the 0.11 threshold is determined to be a questionable measurement as such a ratio is theoretically not possible from the uranium emissions alone. Whilst the approach is illustrated in relation to one of the ratios, a similar approach can be taken to the other ratios too.

Figure 3:
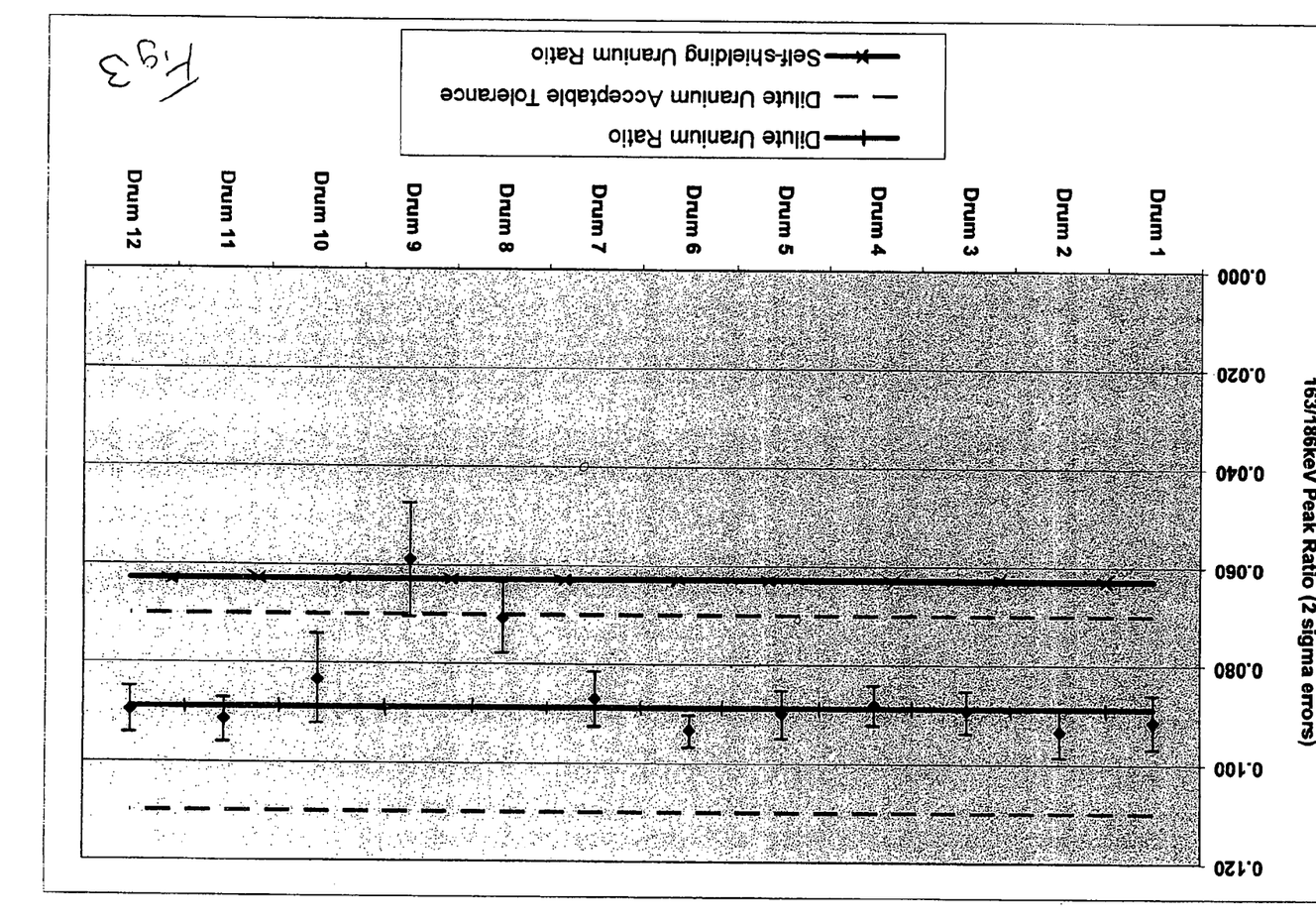
FIG. 3 illustrates the consideration of a number of unknown samples in the context of the 163 keV to 186 keV ratio.
Figure 4:
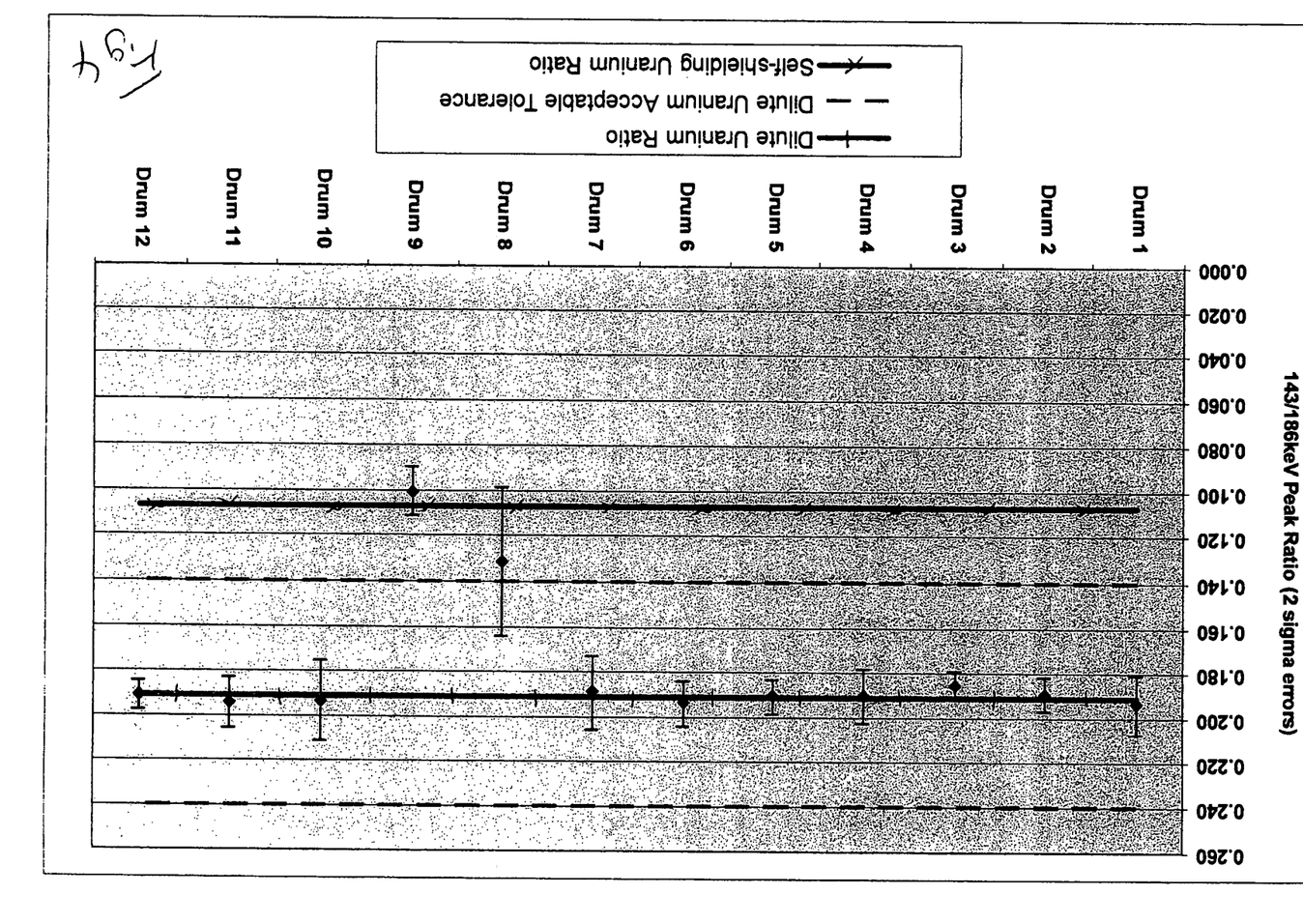
FIG. 4 illustrates the consideration of the number of unknown samples in the context of the 143 keV to 186 keV ratio.
Figure 5:
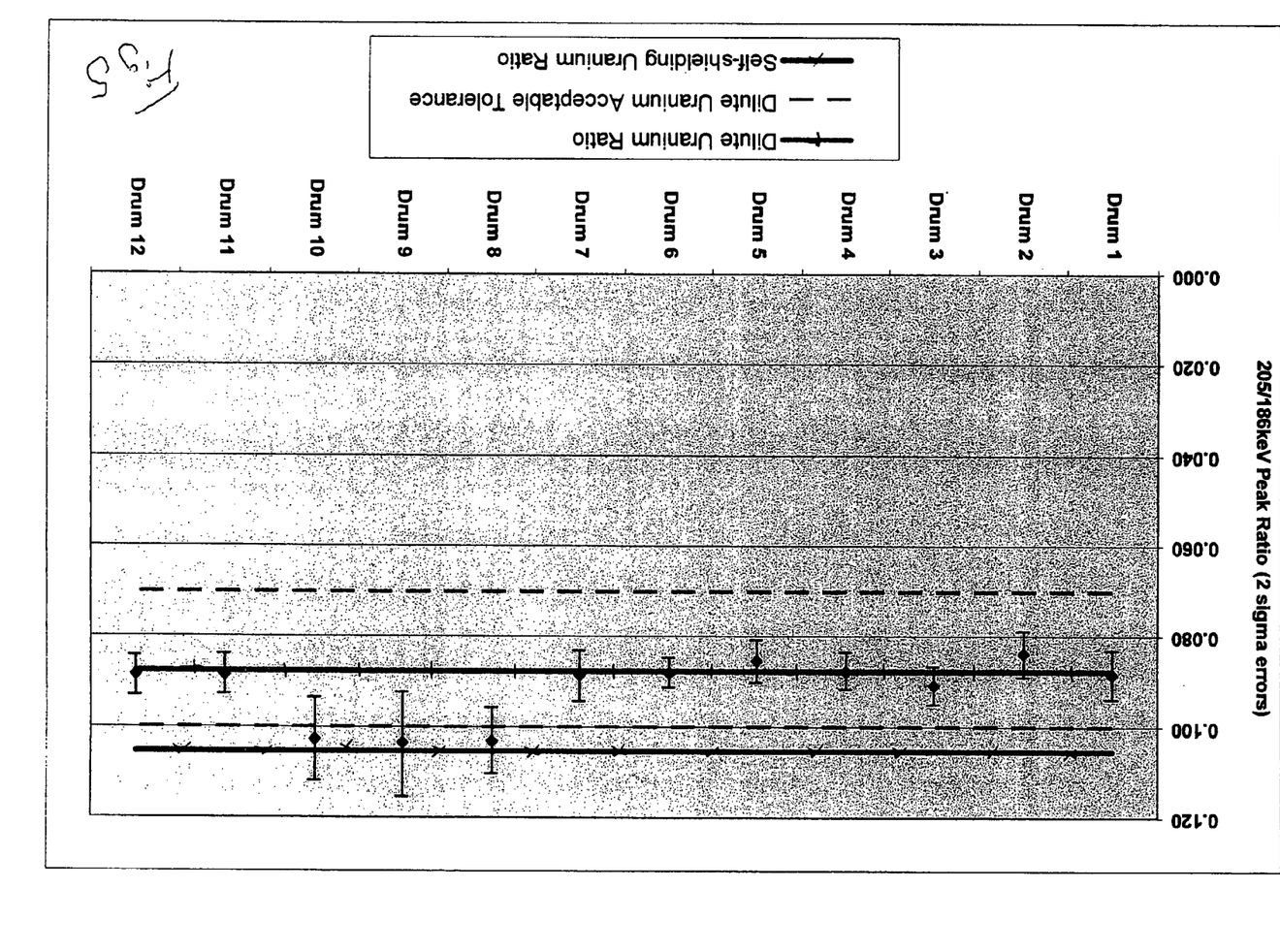
FIG. 5 illustrates the consideration of the number of unknown samples in the context of the 205 keV to 186 keV ratio.

To verify the approach, a series of waste drums were taken and split into a series of repackaged drums. The count ratios were then determined for the three count ratios referred to above. The values for the ratios were then considered against the threshold value range discussed above, with appropriate thresholds for the three ratios. The results provide comment on the uranium dispersion present in the repackaged drums. The results are presented in FIG. 3 (in respect of the 163 keV to 186 keV ratio), in FIG. 4 (in respect of the 143 keV to 186 keV ratio) and in FIG. 5 (in respect of the 205 keV to 186 keV ratio). The value determined for each drum, together with an error bar indicating twice the error applying up and twice the error applying down are shown. Drum 9 potentially falls outside the threshold value range in respect of all three ratios. Drums 8 and 10 are outside in respect of one or two of the ratios, but within the range in respect of at least one ratio. The other drums are within the threshold value range for all three ratios and thus give a confident "dispersed" uranium result. In respect of drums which are outside the range in respect of one or more ratios, it is possible to increase the count time for the measurements and so potentially reduce the error bar to a point where the result falls within the range. The use of three ratios gives increased confidence to the result.

In the above mentioned format, the technique provides a dispersed or non-dispersed indication for the uranium. Quantification of the size of the uranium material encountered is also possible based on the observed value for the ratios compared with the known size of material which gave such a ratio in the known sample measurements.

Other emission energies can be used to form such ratios and/or other ratios can be formed of the four energies identified above, to similar ends.

The basic approach can be supplemented with correction for the effects of the matrix which forms the bulk of the sample and in which the uranium is dispersed. By considering the effects of the matrix on different energies arising from a transmission source, such as $Eu^{152}$, the attenuation effect of the matrix can be established. The values obtained for the energies can then be individually corrected for matrix attenuation only and the resulting energy ratios also be corrected. An indication of the presence or absence of significantly self-shielding can thus be reached which is corrected for the matrix effect. In most situations the matrix effect will in any event be minor compared with the self-shielding effect, due to the lower density and atomic number of the matrix materials. The extent of the matrix effect can be determined by considering the corrected and uncorrected ratios against one another.

In another supplement to the basic approach, it is possible to consider whether or not other emission sources may have contributed to one or more of the energies considered in the ratios. A correction may then be provided. In particular, one or more of plutonium, americium or radium may need to be corrected for. In the case of plutonium, this is because of $Pu^{239}$ emitting gammas at 143.3 keV, 161.5 keV and 203.6 keV. In the case of americium, this is because of $Am^{241}$ emitting gammas at 146.6 keV, 164.5 keV and 203.8 keV. In the case of radium, this is because of $Ra^{226}$ emitting gammas at 186 keV.

The presence or risk of such interference at the energies of interest may be indicated by other characteristic energies specific to one of those isotopes.

If identified as present, correction may be effected. This may consider the observed intensity at another energy and remove an appropriate amount from the intensities measured at the other energies. The subtraction may be attenuation corrected, preferably individually corrected for the different energies and hence different extent of attenuation. Correction may only be deemed necessary where all three ratios are so effected. Otherwise the unaffected ratio or ratios may be used.

Whilst the approach has been described above with specific reference to uranium, it is applicable to other radioactive materials, particularly where a gamma based investigation is conducted. This would include plutonium investigations, particularly where neutron based measurements are not easy, for instance due to a lack of access to all sides of the location containing the plutonium.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining a dispersion format of a radioactive material within a matrix, wherein said radioactive material is potentially present in a dispersion format which is self-shielding against emissions arising from said radioactive material, the method comprising:

measuring emissions from said radioactive material within said matrix at three or more energies selected from energies about 143.8 keV, about 163.3 keV, about 185.7 keV, about 205.3 keV, about 766.4 keV, about 1001.0 keV;

determining a ratio of emissions at one said energy to emissions at another said energy in respect of at least two different pairs of said energies;

obtaining a ratio value of said ratio of the emissions at the two energies for each of said pairs of energies;

comparing one said ratio value to a first threshold value, wherein when one said ratio value is to one side of said first threshold value said dispersion format for said radioactive material in said matrix is determined to be a dispersion format which is self-shielding against emissions arising from said radioactive material; and comparing second said ratio value to a second threshold value, wherein when second said ratio value is to one side of said second threshold value said dispersion format for said radioactive material in said matrix is determined to be a dispersion format which is self-shielding against emissions arising from said radioactive material.

2. A method for providing information on the dispersion format of a radioactive material within a matrix, the method comprising:

measuring the emissions from the radioactive material within the matrix at two or more energies;

determining the ratio of the emissions at one of the energies to the emissions at another of the energies; and comparing the ratio value for the ratio of the emissions at the two energies to a value, the value having one side and the value having another side; and wherein when said ratio value is to the one side of said value said dispersion format for said radioactive material in said matrix is determined to be a dispersion format which is self shielding against emissions arising from said radioactive material; and wherein when said ratio value is to one side of said value said dispersion format for said radioactive material in said matrix is determined to be a dispersion format which is not self shielding against emissions arising from said radioactive material.

3. A method according to claim 2 in which the value is a threshold value.

4. A method according to claim 2 in which one or more of the energies at which emissions are measured are selected from amongst the following: 143.8 keV; 163.3 keV; 185.7 keV; 205.3 keV; 766.4 keV; 1001.0 keV.

5. A method according to claim 2 in which the pair of energies for which the ratio of the emissions at one of the energies to the emissions at another of the energies is determined is provided by any two from amongst the energies: 143.8 keV; 163.3 keV; 185.7 keV; 205.3 keV; 766.4 keV; 1001.0 keV.

6. A method according to claim 2 in which the pairs for which the ratio of the emissions at one of the energies to the emissions at another of the energies is determined are provided by one or more of the following pairs of energies: 143.8 keV and 185.7 keV; 163.3 keV and 185.7 keV; 205.3 keV and 187.5 keV.

7. A method according to claim 2 in which the threshold value is the boundary between a first dispersion format and a second dispersion format.

8. A method according to claim 7 in which the first dispersion format is a format not giving self-shielding and/or a dispersed format.

9. A method according to claim 7 in which the second dispersion format is a format giving self-shielding and/or a non-dispersed format.

10. A method according to claim 2 in which one or more of the following pairs of energies and threshold value therefore is used:

in respect of the ratio 143.8 keV to 185.7 keV a threshold value of 0.14±0.02;

in respect of the ratio 163.3 keV to 185.7 keV a threshold value of 0.07 +0.01 or −0.005; and in respect of the ratio 205.3 keV to 187.5keV a threshold value of 0.10−0.01 or +0.005.

11. A method according to claim 2 in which one or more of the following pairs of energies and threshold value therefore is used:

in respect of the ratio 185.7 keV to 143.8 keV a threshold value of 7.2±0.4;

in respect of the ratio 185.7 keV to 163.3keV a threshold value of 14.3±2;

in respect of the ratio 187.5 keV to 205.3 keV a threshold value of 10.0±2.4.

12. A method according to claim 2 in which a further threshold value is provided.

13. A method according to claim 12 in which one or more of the following pairs of energies and further threshold values is used:

in respect of the ratio 143.8 keV to 185.7 keV a further threshold value of 0.24±0.05;

in respect of the ratio 163.3 keV to 185.7 keV a further threshold value of 0.11±0.02; and in respect of the ratio 205.3 keV to 187.5 keV a further threshold value of 0.07±0.02.

14. A method according to claim 12 in which one or more of the following pairs of energies and further threshold values is used:

in respect of the ratio 185.7 keV to 143.8 keV a further threshold value of 4.17±0.4;

in respect of the ratio 185.7 keV to 163.3 keV a further threshold value of 9.1±2; and in respect of the ratio 187.5 keV to 205.3 keV a further threshold value of 14.3±2.4.

15. A method according to claim 2 in which in the comparison, where the ratio value is closer to the zero diameter ratio value than the threshold value, the indication is that the radioactive material is dispersed in the matrix.

16. A method according to claim 12 in which in the comparison, where the ratio value is between the threshold value and the further threshold value the indication is that the radioactive material is dispersed in the matrix.

17. A method according to claim 2 in which in the comparison, where the ratio value is on the other side of the threshold value compared with the zero diameter ratio value, the indication is that the radioactive material is not dispersed within the matrix.

18. A method according to claim 12 in which in the comparison, where the ratio value is on the other side of the further threshold value compared with the zero diameter ratio value, the indication is that the measurement is not reliable and/or that further investigation is required.

19. A method according to claim 2 in which the measured emissions are corrected to remove emissions from one or more one or more of plutonium, americium or radium within the matrix.

20. A method according to claim 19 in which the measured emissions are corrected to remove one or more of
   $Pu^{239}$ emitted gammas at 143.3 keV;
   $Pu^{239}$ emitted gammas at 161.5 keV;
   $Pu^{239}$ emitted gammas at 203.6 keV;
   $Am^{241}$ emitted gammas at 146.6 keV;
   $Am^{241}$ emitted gammas 164.5 keV;
   $Am^{241}$ emitted gammas 203.8keV;
   $Ra^{226}$ emitted gammas at 186 keV.

21. A method according to claim 2 in which the measured emissions are corrected for matrix attenuation by considering the effect of the matrix on a transmission source.

22. A method for providing information on the self shielding of a radioactive material within a matrix, the method comprising:
   measuring the emissions from the radioactive material within the matrix at two or more energies;
   determining the ratio of the emissions at one of the energies to the emissions at another of the energies; and
   comparing the ratio value for the ratio of the emissions at the two energies to a threshold value, a ratio value to one side of the threshold value indicating no self-shielding for the radioactive material in the matrix.

23. A method according to claim 22 in which an indication of no self-shielding for the radioactive material is provided where the self-shielding is below a given level.

24. A method according to claim 22 in which a ratio value to the other side of the threshold value is taken to indicate self-shielding for the radioactive material.

* * * * *